United States Patent
Wolf et al.

(10) Patent No.: US 10,386,448 B2
(45) Date of Patent: Aug. 20, 2019

(54) SYSTEMS AND METHODS FOR SELECTING ATMOSPHERIC DATA OF REFERENCE NODES FOR USE IN COMPUTING THE ALTITUDE OF A RECEIVER

(71) Applicant: NextNav, LLC, Sunnyvale, CA (US)

(72) Inventors: Thomas Wolf, Mountain View, CA (US); Michael Dormody, Sunnyvale, CA (US)

(73) Assignee: NextNav, LLC, Sunnyvale, CA (US)

( * ) Notice: Subject to any disclaimer, the term of this patent is extended or adjusted under 35 U.S.C. 154(b) by 402 days.

(21) Appl. No.: 15/238,302

(22) Filed: Aug. 16, 2016

(65) Prior Publication Data
US 2016/0356875 A1    Dec. 8, 2016

Related U.S. Application Data

(60) Provisional application No. 62/214,741, filed on Sep. 4, 2015.

(51) Int. Cl.
*G01S 5/02* (2010.01)
*G01C 5/06* (2006.01)
*G01S 19/45* (2010.01)

(52) U.S. Cl.
CPC ............ *G01S 5/0236* (2013.01); *G01C 5/06* (2013.01); *G01S 19/45* (2013.01)

(58) Field of Classification Search
CPC ...... G01S 5/0236; G01S 19/45; G01S 5/0257; G01S 5/0263; G01C 5/06; G01C 21/206; G01C 25/00; G01C 5/005; H04B 7/185; H04M 1/00; H04W 4/025; H04W 64/006
See application file for complete search history.

(56) References Cited

U.S. PATENT DOCUMENTS

| 2009/0217754 A1* | 9/2009 | Binda | G01C 5/06 73/384 |
| 2012/0265373 A1* | 10/2012 | Ingvalson | G01C 5/06 701/4 |
| 2013/0324154 A1* | 12/2013 | Raghupathy | G01S 19/10 455/456.1 |

(Continued)

FOREIGN PATENT DOCUMENTS

| EP | 2511657 A1 | 10/2012 |
| WO | 2012052766 A2 | 4/2012 |

(Continued)

OTHER PUBLICATIONS

Form PCT/ISA/220, PCT/US16/47169, "Notification of Transmittal of the International Search Report and the Written Opinion of the International Searching Authority, or the Declaration", 1 page(s); Form PCT/ISA/210, PCT/US16/47169, "International Search Report", 6 page(s); Form PCT/ISA/237, PCT/US16/47169, "Written Opinion of the International Searching Authority", 8 page(s). dated Nov. 30, 2016.

*Primary Examiner* — Nathan S Taylor (57) ABSTRACT

Using atmospheric data from one or more reference nodes to estimate an altitude of a receiver. Assistance data associated with a set of reference nodes within a region is identified, and the assistance data is used to identify atmospheric reference data associated with a subset of selected reference nodes. An estimate of the receiver's altitude is generated using the atmospheric reference data from the subset of reference nodes.

20 Claims, 9 Drawing Sheets

(56) References Cited

U.S. PATENT DOCUMENTS

| | | | | |
|---|---|---|---|---|
| 2014/0087752 A1* | 3/2014 | Zhu | ................ | H04W 24/00 |
| | | | | 455/456.1 |
| 2014/0174175 A1* | 6/2014 | Chun | ................ | G01C 5/06 |
| | | | | 73/384 |
| 2014/0200846 A1* | 7/2014 | Wachter | ................ | G01C 5/06 |
| | | | | 702/138 |
| 2015/0133145 A1* | 5/2015 | Palanki | ................ | H04W 4/025 |
| | | | | 455/456.1 |
| 2015/0233713 A1* | 8/2015 | Wolf | ................ | G01C 5/06 |
| | | | | 702/166 |
| 2016/0033286 A1* | 2/2016 | Gemelli | ................ | H04W 76/10 |
| | | | | 701/467 |
| 2016/0044464 A1* | 2/2016 | De Lorenzo | ................ | H04W 4/025 |
| | | | | 455/456.1 |
| 2016/0047649 A1* | 2/2016 | Edge | ................ | H04W 4/025 |
| | | | | 455/73 |
| 2016/0258749 A1* | 9/2016 | MacGougan | ................ | G01C 5/06 |
| 2017/0188327 A1* | 6/2017 | Shvodian | ................ | H04W 4/043 |
| 2018/0252521 A1* | 9/2018 | Dormody | ................ | G01K 7/00 |

FOREIGN PATENT DOCUMENTS

| | | |
|---|---|---|
| WO | 2012065184 A2 | 5/2012 |
| WO | 2014150693 A1 | 9/2014 |

\* cited by examiner

SYSTEMS AND METHODS FOR SELECTING ATMOSPHERIC DATA OF REFERENCE NODES FOR USE IN COMPUTING THE ALTITUDE OF A RECEIVER

FIELD

This disclosure relates to positioning in wireless communications networks, and more particularly, to using selected atmospheric data from one or more atmospheric sensors to estimate an altitude of a receiver.

BACKGROUND

Determination of an exact location of a mobile receiver in an urban environment can be quite challenging, especially when the receiver is located in a multi-story building. Imprecise estimates of the receiver's altitude, for example, can delay emergency response, forcing emergency response units to search several floors instead of one floor. Identifying the wrong floor level could also disrupt efforts to restrict, grant, or track a user's access to rooms or information based on the location of that user. Similarly, inaccurate estimates of position may frustrate the user by extending navigation times.

One aide in determining a receiver's altitude with acceptable accuracy uses atmospheric reference data (e.g. atmospheric pressure and temperature) measured at different atmospheric reference nodes having atmospheric sensors of known altitudes in a region within which the receiver resides. Such reference nodes may provide the atmospheric reference data with various levels of accuracy depending on the implementation (e.g. measured pressure within 10 Pascals of true pressure at least 90% of the time, and measured temperature within a few degrees of true temperature 90% of the time).

Unfortunately, atmospheric reference data from a particular reference node can be unreliable at times because of various issues. Localized weather phenomena may affect the reliability of the atmospheric reference data—e.g. wind, humidity, or fluctuations in air temperature can affect pressure measurements. The reliability of atmospheric reference data may also be affected by other adverse conditions like overheating of the reference node due to sun effects, sensor drift of the reference node, poor calibration of the reference node, and other conditions. Thus, it may be advantageous to selectively not use unreliable atmospheric reference data from certain reference nodes.

Clearly, systems and methods for identifying reliable or unreliable atmospheric reference data are needed.

DETAILED DESCRIPTION

This disclosure describes various approaches for estimating a receiver's altitude using atmospheric data (e.g. pressure, temperature, and optionally humidity) from one or more reference nodes along with atmospheric data from the receiver. Examples illustrating how atmospheric reference data may be used to estimate the receiver's altitude are provided below before attention is turned to different approaches for selecting which atmospheric reference data from reference nodes to use when estimating the receiver's altitude.

Using Atmospheric Reference Data to Estimate a Receiver's Altitude

Atmospheric pressure measured by a pressure sensor of a receiver may be used to estimate the altitude of the receiver. In order to translate pressure measurements into an estimate of the altitude of the receiver, additional information is often required. One formula for relating pressure to altitude is based upon the weight of a column of air is written as:

$$z_1 - z_2 = -\frac{RT}{g}\ln\left(\frac{P_1}{P_2}\right), \quad \text{(Equation 1)}$$

where $z_1$ is the unknown altitude of the receiver, $z_2$ is a known altitude of a reference level, $P_1$ is the pressure measured at the receiver, $P_2$ is the pressure at the reference level, T is the temperature of the air, R represents the specific gas constant of air (assumed to be 287.052 m²/Ks² for simplicity), and g=9.80665 m/s² is the acceleration due to gravity. This formula provides relative information, which can be used to determine the difference in altitude for a difference in pressure, and is generally used with $z_2$=0=sea level, so that $P_2$=$P_0$ is the "reference" pressure at a reference level of sea level. Because the reference level pressure can vary significantly with weather conditions and with location, the reference level pressure is needed in addition to the pressure at the site where altitude is to be determined.

When applying standard atmosphere conditions, a 1 meter increase in altitude corresponds to approximately a 12 Pascal decrease in pressure. To determine altitude ($z_1$) with a resolution of 1 floor (usually a maximum of 3 meters), the reference pressure (e.g. the pressure for the reference level) should be known with accuracy significantly finer than 36 Pa. It is also worth noting that errors in temperature can correspond to errors in estimated altitude. This can become significant when determining altitude significantly above the reference level, and when trying to resolve upper floors in a high rise building that are hundreds of feet above the reference level.

In order to estimate altitude to 1 meter accuracy, a positioning system with reference nodes for providing accurate reference pressure information is needed. Such a positioning system may be designed to provide measurements that are close in temperature, distance and time to the unknown altitude $z_1$.

Determining an altitude of a receiver using reference pressure can be accomplished using equations described below.

Given reference nodes at n locations (e.g. each co-located with a transmitter), a reference pressure for a reference level is estimated based on reference node outputs. This can be accomplished in two steps, but is not so limited.

At a first step, given each reference node's altitude $h_i$ (in meters) above a reference level at transmitter i, and the pressure $p_i$ (in Pascals) and the temperature $T_i$ (in Kelvin) measurements from the reference node, the reference level atmospheric pressure $P_i$ ("reference pressure", or "normalized atmospheric pressure") is calculated as follows, where the reference level is set to sea level for simplicity:

$$P_i = p_i e^{\frac{gh_i}{RT_i}}, \quad \text{(Equation 2)}$$

where g is the gravitational acceleration constant and R is a selected specific gas constant for the local air.

At a second step, the calculated $P_i$ for each of the n transmitter locations are combined into $P_0$ as shown below:

$$P_0 = \frac{\sum_{i=1}^{n} W_i P_i}{\sum_{i=1}^{n} W_i} \quad \text{(Equation 3)}$$

where $W_i$ is a weighting function. The weighting function may be used to give more weight to a $P_i$ for one reference node relative to a $P_i$ for another reference node, or to give a $P_i$ for one reference node no weight to effectively exclude that $P_i$. Thus, the weight offers one way to select which reference pressure(s) associated with which reference node(s) to use when estimating the altitude of the receiver.

Of course, the reference level does not need to be sea level, and can be any altitude, including the mean altitude of a region, the mean altitude of the reference nodes in use, or another altitude.

Further details about how reference pressures for particular reference nodes can be selected for use in determining the receiver's altitude are provided below following a brief description of systems that are implicated by these approaches.

Figure 1:
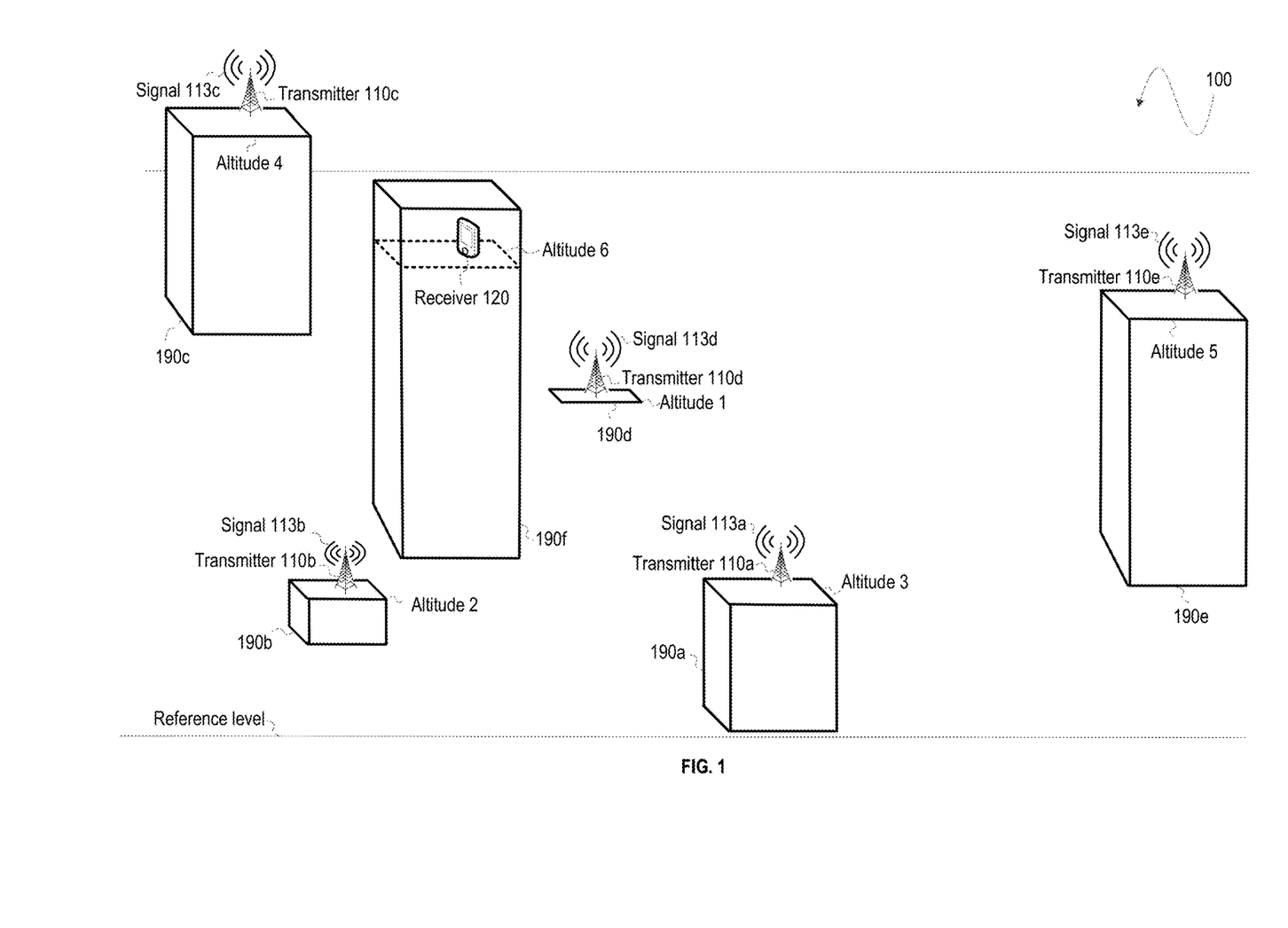
FIG. 1 shows a positioning system on which various embodiments that estimate a receiver's altitude may be implemented.

Selecting Atmospheric Reference Data for Use when Estimating a Receiver's Altitude FIG. 1 shows a positioning system 100 in which various embodiments that estimate a receiver 120's altitude may be implemented.

The positioning system 100 includes any number of receivers 120 that receive signals from and/or send signals to transmitters 110a-110e (hereafter written as "transmitters 110" when referring to the entire group of transmitters 110a-110e or a non-specified group of one or more transmitters). As shown, the transmitters 110 are at various altitudes (e.g. located on or near objects 190). Although not shown in FIG. 1, each transmitter 110 is co-located with a reference node that measures pressure and temperature. Accordingly, to the term "reference node 110" is used herein to identify the reference node that is co-located with its corresponding transmitter.

By way of example, transmitters 110 described herein may include: antenna module(s) for exchanging signals with other systems (e.g. satellites, other transmitters, receivers, a server); RF front end module(s) with circuitry components (e.g. analog/digital logic and power circuitry, tuning circuitry, buffer and power amplifiers, and other components as is known in the art or otherwise disclosed herein); processing module(s) for performing signal processing (e.g. generating signals 113 for transmission to other systems at a selected time, using a selected frequency, using a selected code, and/or using a selected phase), methods described herein, or other processing; memory module(s) for providing storage and retrieval of data and/or instructions relating to methods of operation described herein that may be executed by the processing module(s); sensors module(s) for measuring conditions at or near the transmitter (e.g. pressure, temperature, humidity, wind, or other conditions); and/or interface module(s) for exchanging information with other systems via other links other than a radio link. Signals 113 transmitted by a transmitter 110 may carry different information that, once determined by a receiver 120 or a server, may identify the following: the transmitter 110 that transmitted the signal; the location (LLA) of that transmitter 110; pressure, temperature, humidity, and other conditions at or near that transmitter 110; and/or other information.

A receiver 120 may be in the form of a computing device (e.g. a mobile phone, tablet, laptop, digital camera, tracking tag). A receiver 120 may also take the form of any component of the computing device, including a processor. By way of example, a receiver 120 may include: antenna module(s) for exchanging signals with other systems (e.g. satellites, terrestrial transmitters 110, other receivers 120); RF front end module(s) with circuitry components (e.g. mixers, filters, amplifiers, digital-to-analog and analog-to-digital converters as is known in the art or otherwise disclosed herein); processing module(s) for signal processing of received signals 113 to determine position information (e.g. times of arrival or travel time of received signals 113, atmospheric information from transmitters 110, and/or location or other information associated with each transmitter 110), for using the position information to compute an estimated position of the receiver 120, for performing methods described herein, and/or for performing other processing; memory module(s) for providing storage and retrieval of data and/or instructions relating to methods of operation described herein that may be executed by the processing module(s) or other module(s); sensor module(s) for measuring environmental conditions at or near the receiver 120 (e.g. pressure, temperature, humidity, wind), which may be compared to the same type of environmental conditions at or near transmitters 110 to determine the altitude of the receiver 120; other sensor module(s) for measuring other conditions (e.g. acceleration, velocity, orientation, light, sound); interface module(s) for exchanging information with other systems via other links other than a radio link; and/or input/output module(s) for permitting a user to interact with the receiver 120.

Figure 2:
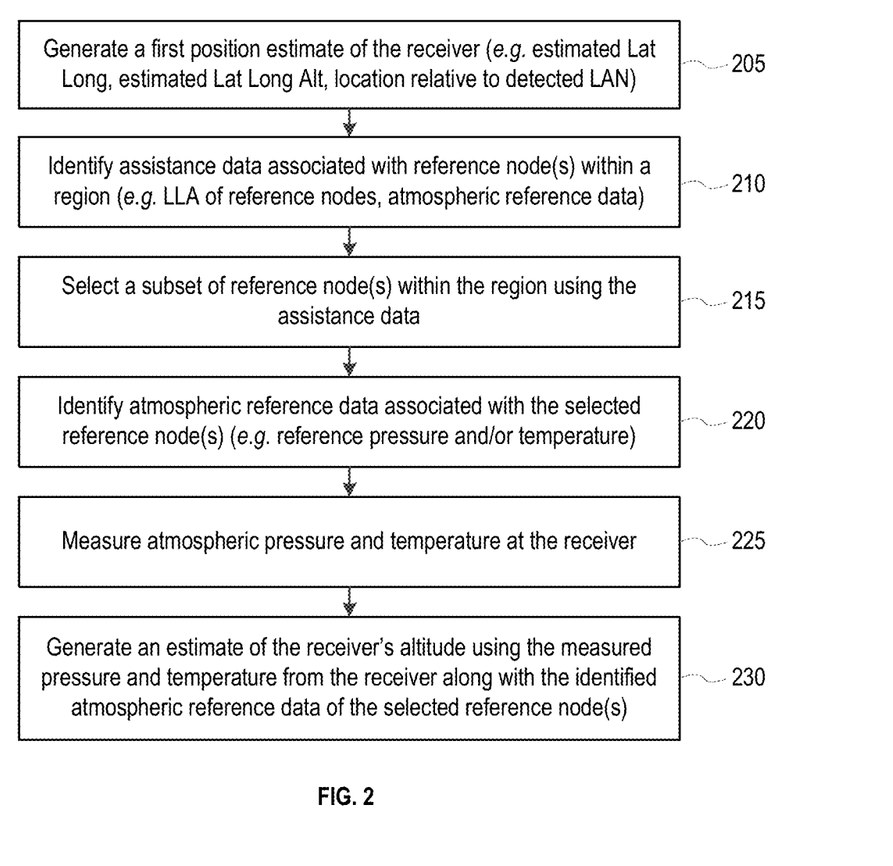
FIG. 2 details a process for using a positioning system to estimate a receiver's altitude.

Attention is now drawn to FIG. 2, which details a process for using the positioning system 100 to estimate the altitude of the receiver 120.

The process begins with generating a first position estimate of the receiver 120 (step 205). The first position estimate may be represented by a latitude longitude (LL) pair, an altitude (A), or as a latitude longitude altitude (LLA) triplet. The first position estimate may be generated using a terrestrial positioning system, a satellite positioning system, the location of a local network of which the receiver 120 is within range, or an alternative system.

At step 210, assistance data associated with one or more reference nodes 110 within a region is identified. The assistance data may include an almanac of all of the reference nodes 110, or other data for each of the reference nodes 110 such as: latitude, longitude and altitude (LLA) of that reference node; atmospheric reference data determined by that reference node (e.g. temperature, pressure or reference pressure); a reference level altitude of the reference pressure; other weather information (e.g. wind, humidity, etc.); a quality metric indicating the quality of the atmospheric reference data or other weather information; the transmission channel used by that reference node; timing data for that reference node; a quality metric about the status of that reference node, and other information.

At step 215, a subset of reference nodes within the region are selected. The subset of reference nodes will provide the atmospheric reference data used with the atmospheric pressure and temperature measurements made at the receiver 120 when estimating an altitude of the receiver 120.

At step 220, atmospheric reference data associated with the selected reference nodes are identified. Of course, step 215 could be omitted such that the atmospheric reference data may be selected instead of the reference nodes.

Atmospheric reference data may include temperature measurements and reference pressures (e.g. atmospheric pressure measurements from the reference nodes that have been normalized to a reference level like sea level or another reference level). Other environmental conditions may also be provided, including wind speed, humidity, or others. The conversion of an atmospheric pressure measurement to a reference pressure could be made at the reference node, at the receiver 120, a server, or another component.

At step 225, atmospheric pressure is measured at the receiver 120. Temperature may also be measured, but temperature measurements are often inaccurate.

At step 230, an estimate of the altitude of the receiver 120 is generated using the measurements made at the receiver 120 with the identified/selected atmospheric reference data. By way of example, the equations previously presented above illustrate how the altitude of the receiver 120 may be estimated.

The atmospheric reference data identified at step 220 may be associated with one or more of the selected reference nodes. By way of example, it may be associated with only one reference node; it may be an average of atmospheric reference data associated with more than one reference node; it may be a weighted average of the atmospheric reference data associated with more than one reference node; or other combinations of available atmospheric reference data. The examples that follow include various approaches for selecting reference nodes or atmospheric reference data using various criteria.

Figure 3:
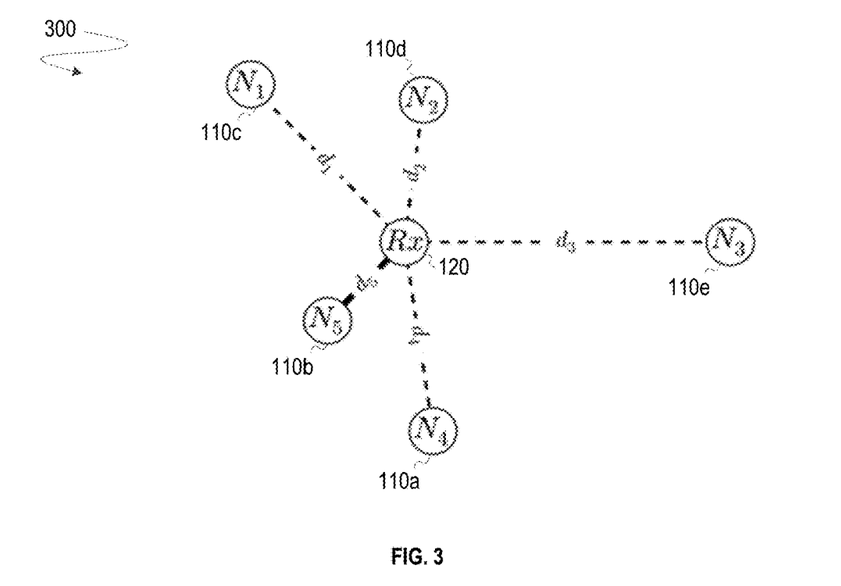
FIG. 3 depicts a positioning system that uses only the atmospheric reference data associated with a reference node that is closest to a receiver to estimate the altitude of the receiver.

FIG. 3 depicts a positioning system 300 that uses only the atmospheric reference data associated with the reference node that is closest (e.g. in terms of horizontal, vertical, or line-of-sight distances) to the receiver 120 to estimate the altitude of the receiver 120. The positioning system 300 includes the receiver 120 and the reference nodes 110a-e. The reference nodes 110a-e are located at distances $d_1$-$d_5$ from the receiver, and distance $d_5$ separating the reference node 110b and the receiver 120 is the shortest line-of-sight distance from among distances $d_1$-$d_5$. A solid black line is drawn between the receiver 120 and the reference node 110b. This line represents that only atmospheric reference data associated with the reference node 110b is used when generating the altitude estimate because the reference node 110b is the closest of the reference nodes 110 to the receiver 120 in terms of line-of-sight distance. Dashed lines are drawn between the receiver 120 and the reference nodes 110a and 110c-110e. These lines represent that atmospheric reference data associated with those reference nodes are not used when generating the altitude estimate.

Figure 4:
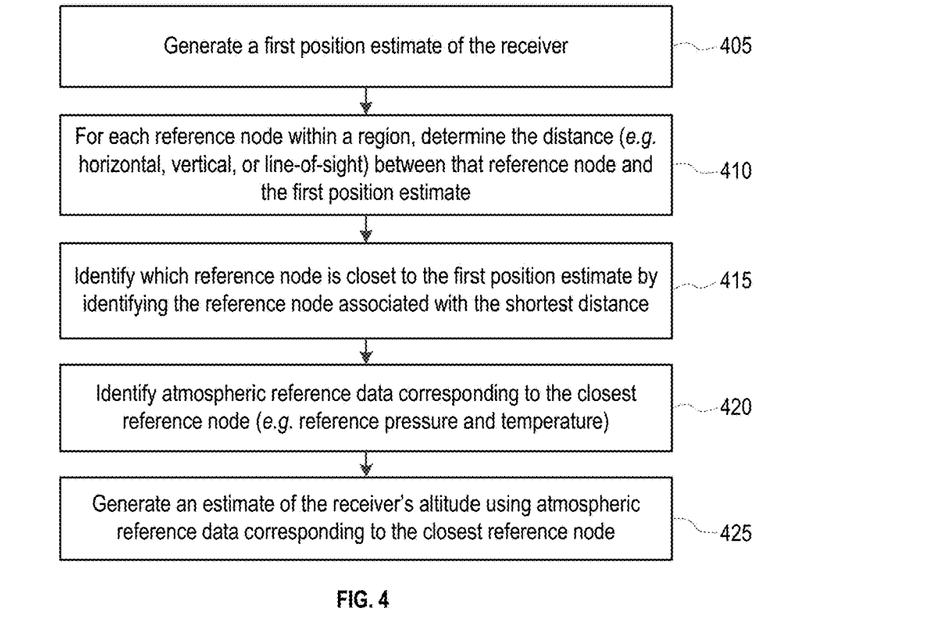
FIG. 4 details a process for selecting one of the reference nodes that is closest to a receiver when estimating the altitude of the receiver.

FIG. 4 details a process for using the positioning system 300 to select one of the reference nodes 110 that is closest to the receiver 120 when estimating the altitude of the receiver 120.

The process begins at step 405 by generating a first position estimate of the receiver 120.

At step 410, the distances between the receiver 120 and each of the reference nodes 110 within a region are determined. These distances may consist of horizontal, vertical, or line-of-sight distances. A line-of-sight distance is considered to be the length of the hypotenuse of a triangle defined by a first leg equal to a horizontal distance and a second leg equal to a vertical distance. Determination of distances and computation of the receiver 120's altitude may be made by the receiver 120, the server, or another system component as would be understood in the art.

At step 415, distances $d_1$-$d_5$ are used to identify the closest of the reference nodes 110. For example, with reference to FIG. 1, the closest of the reference nodes 110 in terms of line-of-sight distance is the reference node 110b, the closest in terms of vertical distance is the reference node 110e, and closest in terms of horizontal distance is the reference node 110b.

At step 420, atmospheric reference data corresponding to the closest of the reference nodes 110 to the receiver 120 is identified.

At step 425, an estimated altitude of the receiver 120 is generated using the atmospheric reference data corresponding to the closest reference node.

Figure 5:
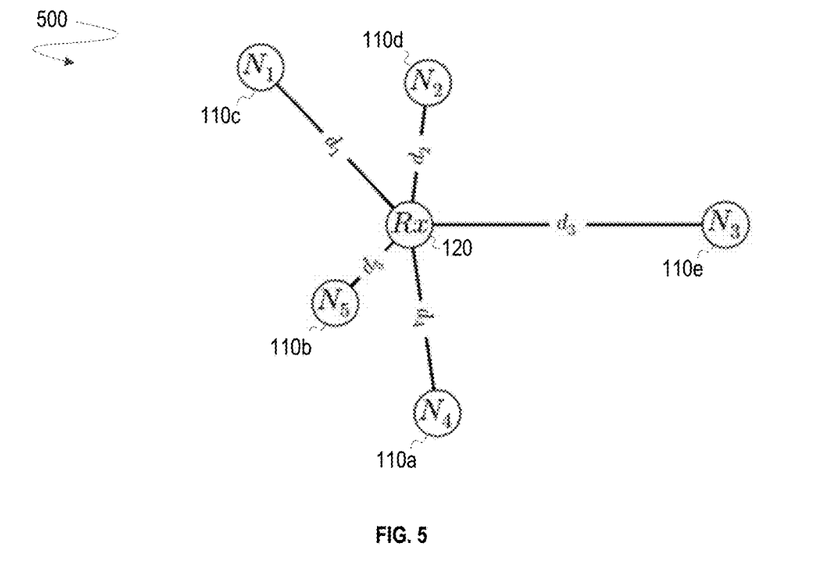
FIG. 5 depicts a positioning system that averages atmospheric reference data associated with any number of reference nodes, and uses the average to estimate the altitude of a receiver.

FIG. 5 depicts a positioning system 500 that averages atmospheric reference data associated with any number of the reference nodes 110a-e, and uses the average to estimate the altitude of the receiver 120. The positioning system 500 includes the receiver 120 and the reference nodes 110a-e. Solid black lines are drawn between the receiver 120 and each of the reference nodes 110a-e. These lines represent that atmospheric reference data associated with each of the reference nodes 110a-e in the positioning system 500 is used when generating the average of atmospheric reference data. The solid black lines are all of an equal width (e.g. weight) to represent that the same or no weighting is applied to the reference pressures or temperatures when generating the average of atmospheric reference data.

Figure 6:
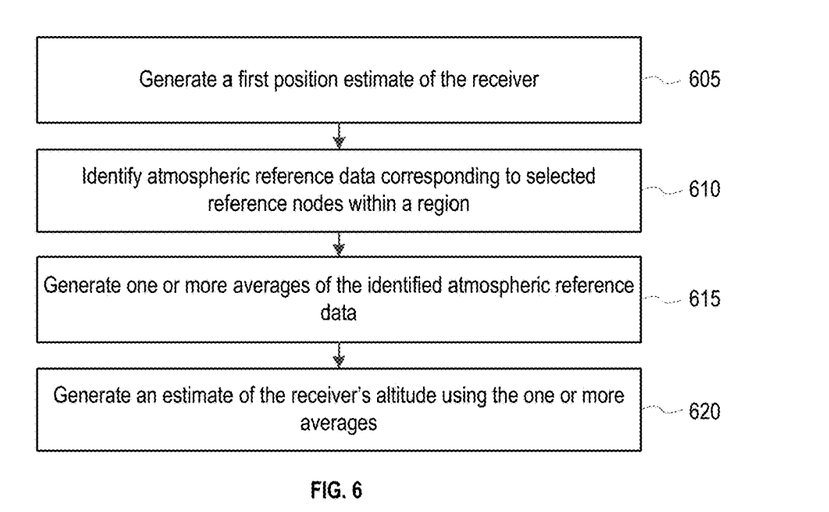
FIG. 6 details a process for generating an average of atmospheric reference data associated with selected reference nodes when estimating the altitude of a receiver.

FIG. 6 details a process for using the positioning system 500 to generate an average of atmospheric reference data associated with selected reference nodes 110 when estimating the altitude of the receiver 120.

The process includes the steps of: generating a first position estimate of the receiver 120 (step 605); identifying atmospheric reference data corresponding to selected reference nodes 110 (step 610); generating an average of the identified atmospheric reference data (e.g. the average value of normalized reference pressure data, the average value of temperature data, etc.) (step 615); and generating an estimated altitude of the receiver 120 using the averaged atmospheric reference data (step 620). Atmospheric reference data associated with each of the selected reference nodes 110 contributes equally to the generated average such that the same or no weighting is applied to individual reference pressures and/or temperatures.

Figure 7:
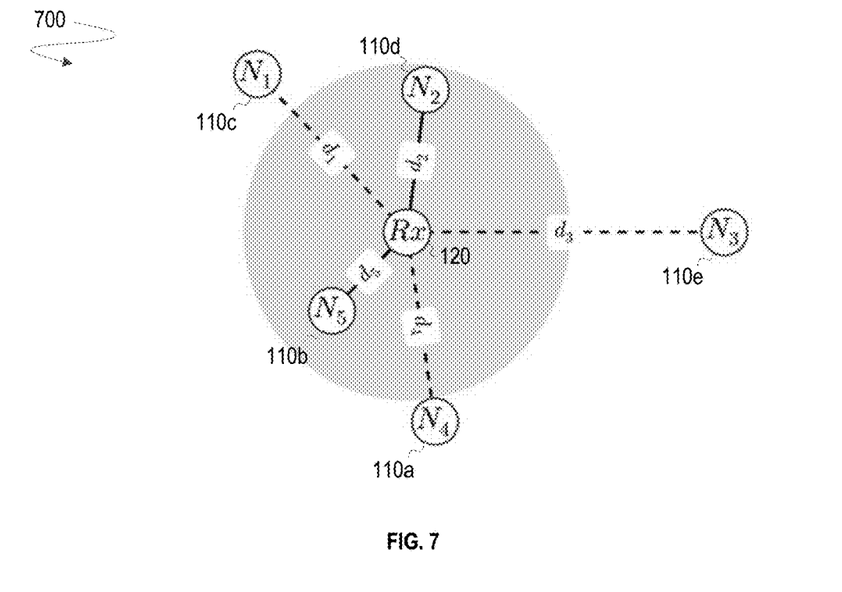
FIG. 7 depicts a positioning system that uses only atmospheric reference data associated with reference nodes within a sub-region to estimate the altitude of a receiver.

FIG. 7 depicts a positioning system 700 that uses only atmospheric reference data associated with reference nodes within a sub-region 730 to estimate the altitude of the receiver 120. The positioning system 700 includes the receiver 120 and the reference nodes 110a-e. The reference nodes 110a-e are located at distances $d_1$-$d_5$ from the receiver 120. The sub-region 730 is defined by the perimeter of a region centered at an initial position estimate of the receiver 120. The sub-region 730 may be defined by a horizontal distance, vertical distance, or line-of-sight distance from the initial position estimate of the receiver 120.

Though drawn as a circle in this example, one of ordinary skill in the art will appreciate that the sub-region 730 could have alternative geometries. For example, the sub-region 730 could be represented by a circle, a rectangle, a hemisphere, or any other volume. Similarly, one of ordinary skill in the art will appreciate that the sub-region 730 could have an alternative center point other than the initial position estimate of the receiver 120. For example, sub-region 730 could be centered at one of the reference nodes 110a-e or otherwise selected.

Solid black lines are drawn from the receiver 120 to both the reference node 110b and the reference node 110d. These lines represent that only atmospheric reference data associated with the reference nodes 110b and 110d is used when generating the average of atmospheric reference data. The solid black lines are both of an equal width (e.g. weight) to represent that the same or no weighting is applied to the reference pressures and/or temperatures when generating the average of atmospheric reference data. Dashed lines are drawn between the receiver 120 and the reference nodes 110a, 110c, and 110e to represent that atmospheric reference data associated with each of these reference nodes is not used as atmospheric reference data when estimating the altitude of the receiver 120 because the reference nodes 110a, 110c, and 110e are each located outside of the sub-region 730.

Figure 8:
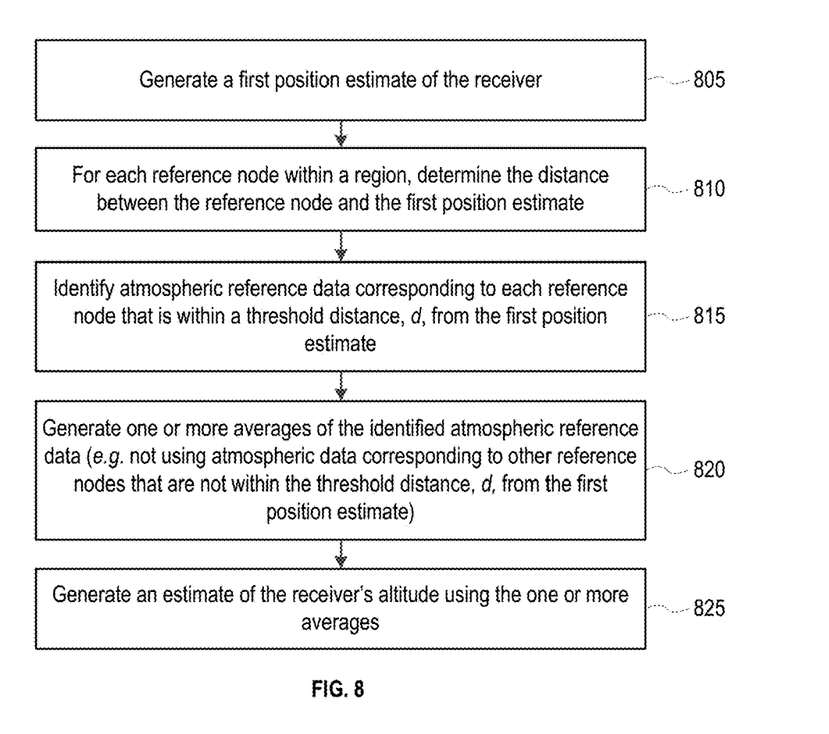
FIG. 8 details a process for generating an average of atmospheric reference data associated with any number of reference nodes located within a sub-region when estimating the altitude of a receiver.

FIG. 8 details a process for using the positioning system 700 to generate an average of atmospheric reference data associated with any number of the reference nodes 110 located within the sub-region 730 when estimating the altitude of the receiver 120.

The process includes the steps of: generating a first position estimate of the receiver 120 (step 805); determining the distances ($d_1$-$d_5$) between the first position estimate and each of the reference nodes 110 within a region(step 810); identifying atmospheric reference data corresponding to each of the reference nodes (e.g. the reference node 110b and the reference node 110d) that is within a threshold distance from the first position estimate (e.g. with the sub-region 730) (step 815); generating an average of the identified atmospheric reference data (step 820); and generating an estimated altitude of the receiver 120 using the one or more averages (step 825).

Figure 9:
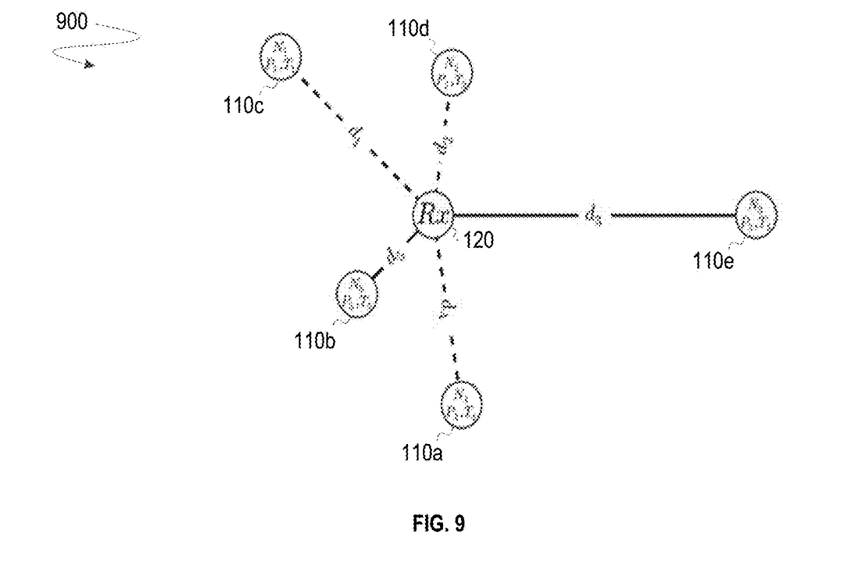
FIG. 9 depicts a positioning system that uses only atmospheric reference data comprising values within an acceptable numerical range to estimate the altitude of a receiver.

FIG. 9 depicts a positioning system 900 that uses only atmospheric reference data comprising values within an acceptable numerical range to estimate the altitude of the receiver 120. The positioning system 900 includes the receiver 120 and the reference nodes 110a-e. Each of the reference nodes 110a-e is associated with an atmospheric pressure data value $P_n$, and a temperature measurement value $T_n$. The atmospheric pressure data typically includes a normalized reference pressure, but could alternatively include a non-normalized atmospheric pressure measurement.

Solid black lines are drawn between the receiver 120 and the reference nodes 110b and 110e. These lines represent that atmospheric reference data associated with the reference nodes 110b and 110e is used when generating the average of atmospheric reference data. The solid black lines are both of an equal width (e.g. weight) to represent that the same or no weighting is applied for these nodes when generating the average of atmospheric reference data. Dashed lines are drawn between the receiver 120 and the reference nodes 110a, 110c, and 110d. These lines represent that atmospheric reference data associated with each of those reference nodes is not used as atmospheric reference data when estimating the altitude of the receiver 120.

Figure 10:
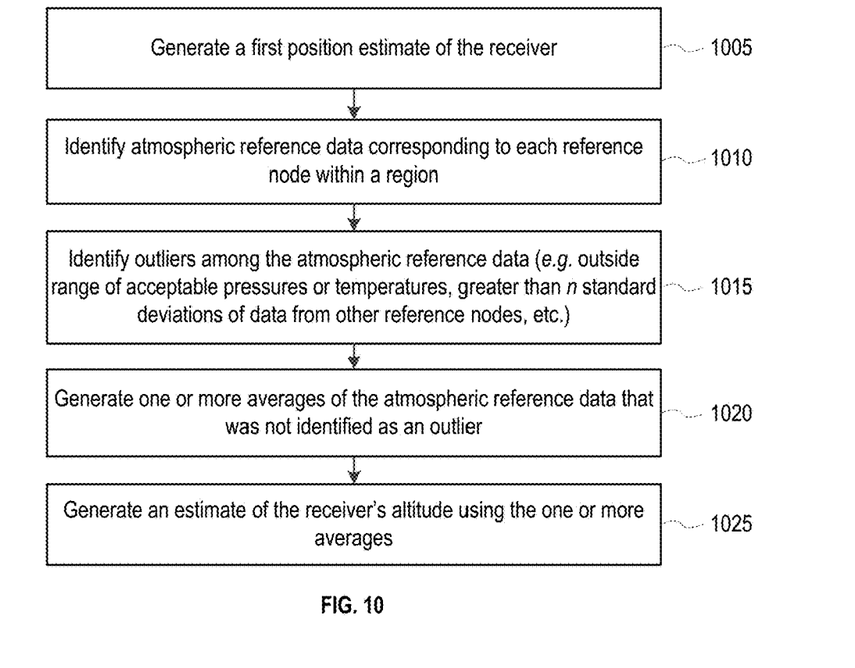
FIG. 10 details a process for generating an average of atmospheric reference data comprising values within an acceptable numerical range when estimating the altitude of a receiver.

FIG. 10 details a process for using the positioning system 900 to generate an average of atmospheric reference data comprising values within an acceptable numerical range when estimating the altitude of the receiver 120.

The process includes the steps of: generating a first position estimate of the receiver 120 (step 1005); identifying atmospheric reference data corresponding to each of the reference nodes 110 within a region (step 1010); identifying numerical outliers within the received atmospheric reference data (step 1015); generating an average of the atmospheric reference data using the atmospheric reference data that was not identified as an outlier (e.g. associated with the reference nodes 110b and 110e) (step 1020); and generating an estimated altitude of the receiver 120 using the averaged atmospheric reference data (step 1025).

Outliers may be considered to be atmospheric reference data that falls outside of an acceptable range of pressures or temperatures. The range may be defined using empirical data, may be defined as greater than a number of standard deviations of data from other reference nodes and/or from the receiver, or may be defined by other considerations. Identification of outliers may advantageously identify a reference node 110 that is measuring heat from a nearby heating system, or that is buried by snow. In both cases, use of atmospheric reference data from that reference node 110, which is providing an inaccurate temperature measurement, is avoided.

Figure 11:
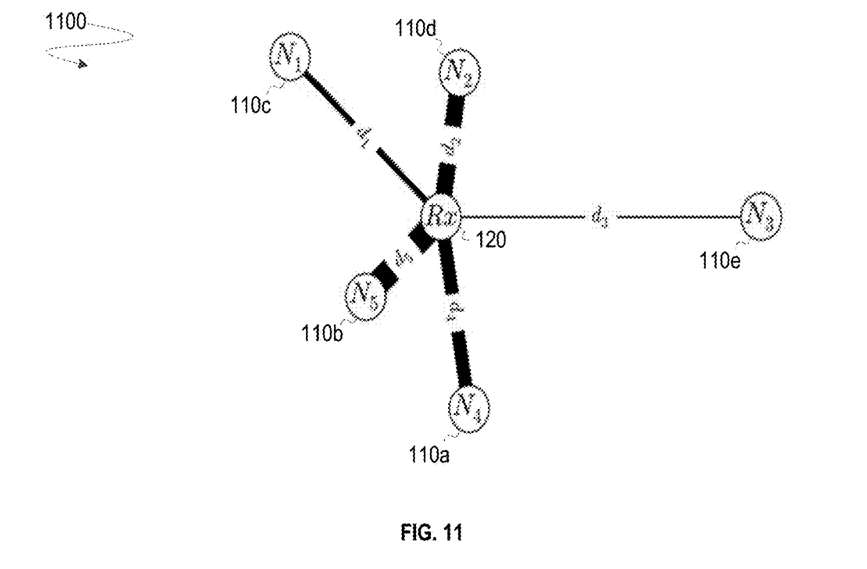
FIG. 11 depicts a positioning system that uses atmospheric reference data associated with reference nodes to generate a weighted average when estimating the altitude of a receiver.

FIG. 11 depicts a positioning system 1100 that uses the atmospheric reference data associated with the reference nodes 110a-e to generate a weighted average when estimating the altitude of the receiver 120. The positioning system 1100 includes the receiver 120 and the reference nodes 110a-e. The reference nodes 110a-e are located at distances $d_1$-$d_5$ from the receiver 120.

Solid black lines are drawn between the receiver 120 and each of the reference nodes 110a-e. These lines represent that atmospheric reference data associated with each of the reference nodes 110 in the positioning system 1100 is used when generating the average of atmospheric reference data. The solid black lines are of varying widths (e.g. weights) to represent that weighting of varying degrees is applied when generating the average of atmospheric reference data.

Figure 12:
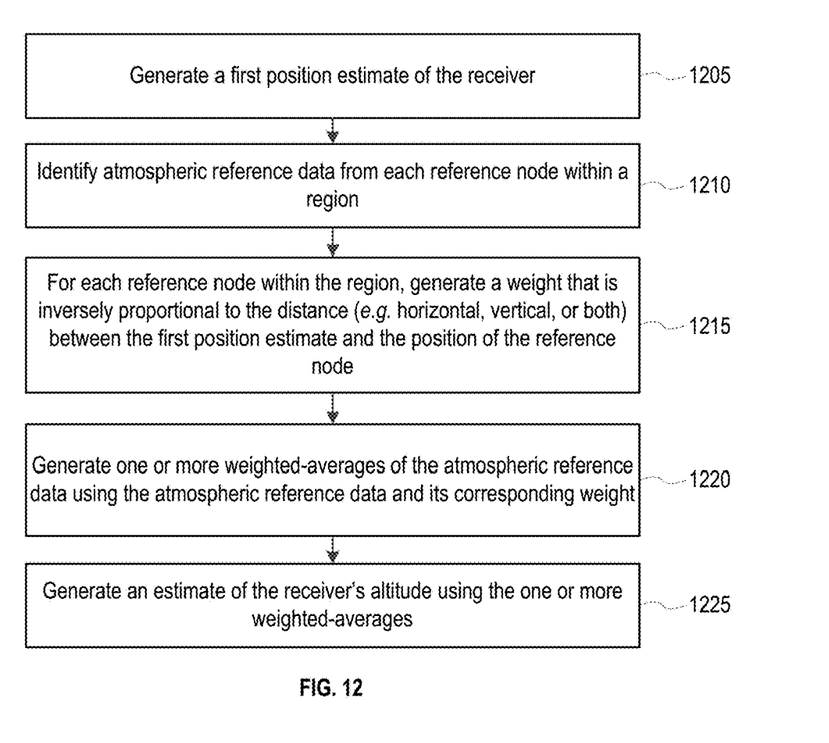
FIG. 12 details a process for generating a weighted average of atmospheric reference data associated with any number of reference nodes when estimating the altitude of a receiver.

FIG. 12 details a process for using the positioning system 1100 to generate a weighted average of atmospheric reference data associated with any number of the reference nodes 110 when estimating the altitude of the receiver 120.

The process includes the steps of: generating a first position estimate of the receiver 120 (step 1205); identifying atmospheric reference data from each of the reference nodes 110 within a region (step 1210); generating, for each of the reference nodes 110 within the region, weights that have an inverse relationship (e.g. inversely proportional, inversely square, or other) to the distances ($d_1$-$d_5$) between the first position estimate and the position of each of the reference nodes 110 within the region (step 1215); generating one or more weighted-averages of the atmospheric reference data using the atmospheric reference data (e.g. from each of the reference nodes 110 within the region) and its corresponding weight (step 1220); and generating an estimated altitude of the receiver 120 using the one or more weighted-averages (step 1225).

In FIG. 12, the weights applied to the atmospheric reference data are inversely proportional to the distance (e.g., horizontal, vertical, or line-of-sight) between each of the reference nodes 110 and the receiver 120. However, alternative weighting schemes may be employed. For example, a weight may be inversely proportional to the difference in temperature measured at the receiver 120 and the temperature measured at each of the reference nodes 110.

Figure 13:
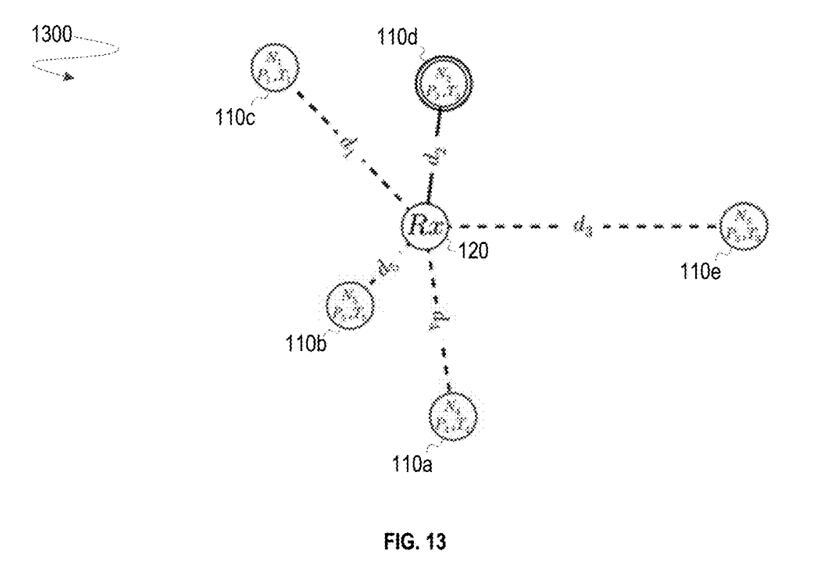
FIG. 13 depicts a positioning system that uses only atmospheric reference data associated with a lowest temperature measurement to estimate the altitude of a receiver.

FIG. 13 depicts a positioning system 1300 that uses only atmospheric reference data associated with the lowest temperature measurement to estimate the altitude of the receiver 120. Atmospheric anomalies located at one of the reference nodes 110 may not correspond to atmospheric conditions located at the receiver 120. Using atmospheric reference data associated with one of the reference nodes 110 experiencing an atmospheric anomaly may negatively impact the accuracy of the estimated altitude for the receiver 120. In certain environments, such anomalies are more likely to be associated with a hot temperature. For example, an atmospheric sensor may be exposed to direct sunlight on a hot roof, or may be heated by a heating system. Thus, it may be advantageous to select one of the reference nodes 110a-e associated with the lowest temperature measurement within a region.

The positioning system 1300 includes the receiver 120 and the reference nodes 110a-e. Each of the reference nodes 110a-e is associated with an atmospheric pressure data value $P_n$, and a temperature measurement value $T_n$. A concentric ring is drawn around 110d to indicate that it is associated with the lowest temperature measurement of the reference nodes 110.

A solid black line is drawn between the receiver 120 and the reference node 110d. This line represents that only atmospheric reference data associated with the reference node 110d is used as atmospheric reference data when estimating the altitude of the receiver 120. Dashed lines are drawn between the receiver 120 and the reference nodes 110a-c and 110e. These lines represent that atmospheric reference data associated with each of those reference nodes is not used as atmospheric reference data when estimating the altitude of the receiver 120.

Figure 14:
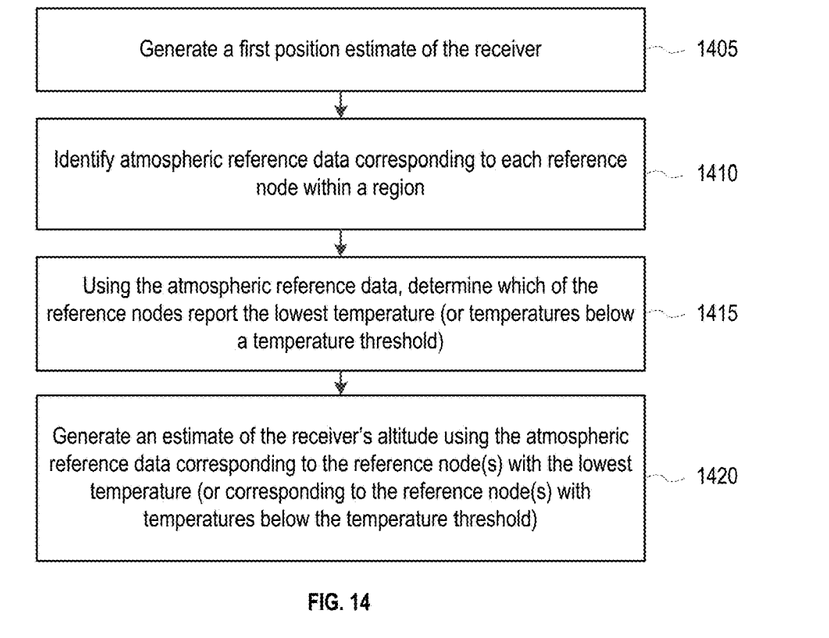
FIG. 14 details a process for selecting one of the reference nodes that measured a lowest temperature when estimating the altitude of a receiver.

FIG. 14 details a process for using the positioning system 1300 to select one of the reference nodes 110 that measured the lowest temperature measurement when estimating the altitude of the receiver 120. Alternatively, any number of the reference nodes 110 that measured temperatures below a temperature threshold may be selected.

The process includes the steps of: generating a first position estimate of the receiver 120 (step 1405); identifying atmospheric reference data corresponding to each of the reference nodes 110 within a region (step 1410); using the atmospheric reference data to determine which of the reference nodes 110 reports the lowest temperature (step 1415); and generating an estimated altitude of the receiver 120 using the atmospheric reference data corresponding to one of the reference nodes 110 with the lowest temperature (step 1420). Alternatively, any number of the reference nodes 110 that measured temperatures below a temperature threshold may be selected, and the altitude estimate may be generated using the atmospheric reference data corresponding to those the reference nodes.

Figure 15:
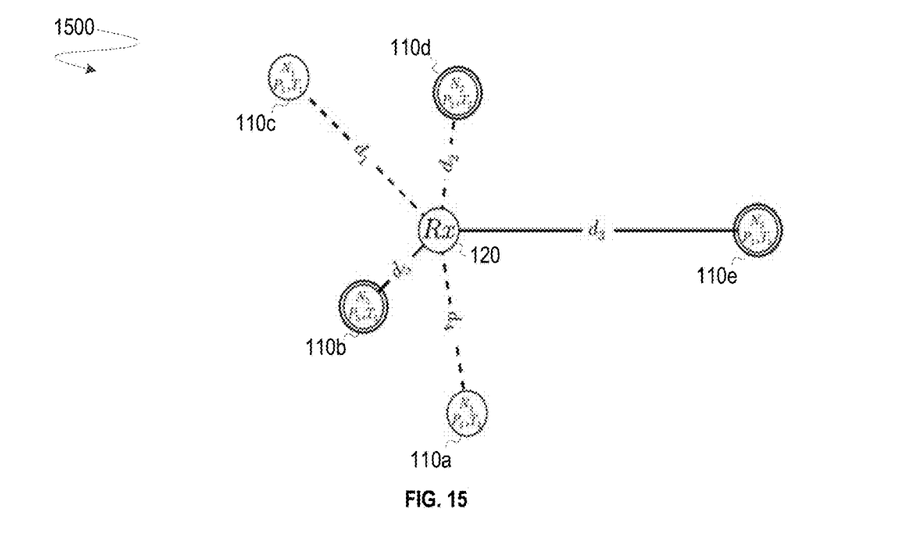
FIG. 15 depicts a positioning system that generates an average of atmospheric reference data using only atmospheric reference data associated with any number of reference nodes that are located within a vertical range of each other and that are each associated with temperature measurements below a temperature threshold value.

FIG. 15 depicts a positioning system 1500 that generates an average of atmospheric reference data using only atmospheric reference data associated with any number of the reference nodes 110a-e that are located within a vertical range of each other and that are each associated with temperature measurements below a temperature threshold value. The average is then used to estimate the altitude of the receiver 120. An additional constraint may be used in some embodiments, where an average of atmospheric reference data is generated using only atmospheric reference data associated with any number of the reference nodes 110a-e that are located within a vertical range of the first position estimate of the receiver 120.

The positioning system 1500 includes the receiver 120 and the reference nodes 110a-e. Each of the reference nodes 110a-e is associated with an atmospheric pressure data value $P_n$, and a temperature measurement value $T_n$.

Solid black lines are drawn between the receiver 120 and the reference nodes 110b and 110e. These lines represent that atmospheric reference data associated with each of the reference nodes 110b and 110e is used when generating the average of atmospheric reference data. The solid black lines are both of an equal width (e.g. weight) to represent that the same or no weighting is applied to the reference pressures or temperatures when generating the average of atmospheric reference data.

Concentric rings are drawn around the reference nodes 110b, 110d and 110e to indicate that their temperature measurements are below a predefined threshold temperature.

In this example, the reference nodes 110b and 110e are within an acceptable vertical range of each other or an initial estimate of the receiver's position ("common altitude"), while the reference node 110d is outside of the vertical range of the reference nodes 110b and 110e or the initial estimate of the receiver's position. The vertical range may be defined by any range.

Dashed lines are drawn between the receiver 120 and the reference nodes 110a, 110c and 110d. These lines represent that atmospheric reference data associated with each of those reference nodes is not used as atmospheric reference data when estimating the altitude of the receiver 120.

Figure 16:
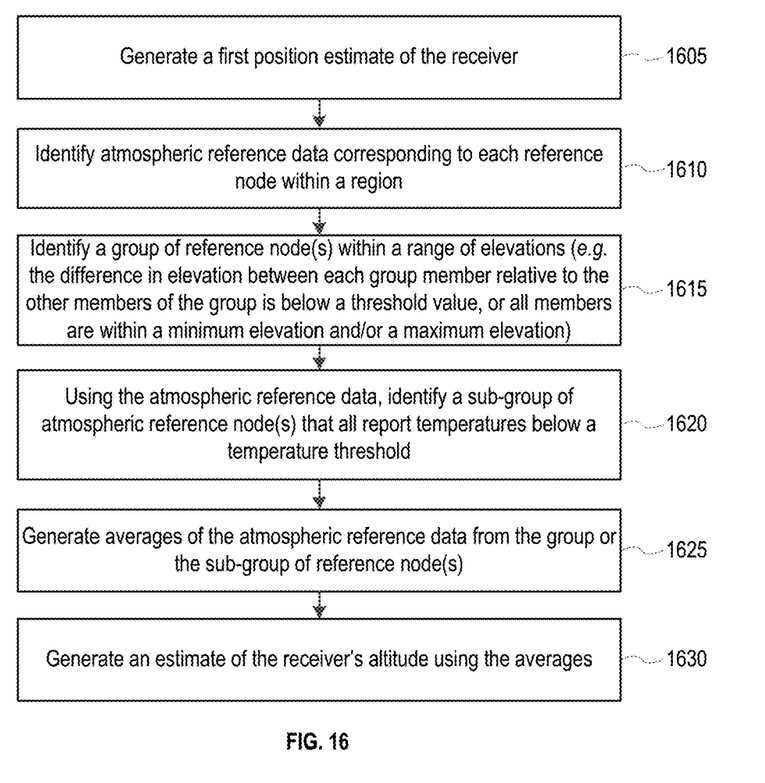
FIG. 16 details a process for selecting any number of reference nodes associated with temperature measurements below a temperature threshold value and located within a vertical range of each other.

FIG. 16 details a process for using the positioning system 1500 to select any number of the reference nodes 110 associated with temperature measurements below a temperature threshold value and located within a vertical range of each other.

The process includes the steps of: generating a first position estimate of the receiver 120 (step 1605); identifying atmospheric reference data corresponding to each of the reference nodes 110 within a region (step 1610); identifying a group of the reference node(s) 110 within a range of elevations (step 1615); using the atmospheric reference data to identify a sub-group of the reference nodes 110 that all report temperatures below a temperature threshold (step 1620); generating one or more averages of the atmospheric reference data from the identified sub-group of the reference nodes 110 (step 1625); and generating an estimated altitude of the receiver 120 using the averaged atmospheric reference data (step 1630).

Certain embodiments above describe averaging where equal weighting is applied to individual atmospheric reference data. Of course, in alternative embodiments, individual atmospheric reference data may be weighted using different weights before all of the selected atmospheric reference data is averaged.

Certain embodiments above describe selection of reference nodes (or their atmospheric reference data) for use in estimating the altitude of a receiver. One of ordinary skill will appreciate that reference nodes (or their atmospheric reference data) may be selected in order to exclude the atmospheric reference data of the selected references nodes from being used to estimate the altitude of a receiver. For example, reference nodes that are above or below a specified elevation, outside a specified region, or that have atmospheric reference data below or above a specified value, could be initially excluded from consideration. The inverse of examples provided above could also be used to exclude reference nodes from consideration.

In some embodiments, a reference node that is associated with a parameter that satisfies a threshold criterion is selected. Such parameters may include: an atmospheric measurement of the node (e.g. pressure, temperature, or other); a location of the node (e.g. a one-, two-, or three-dimensional coordinate); an age of an atmospheric sensor at the node; a time since an atmospheric sensor at the node was calibrated; or other parameter that can be associated with a reference node. Respective threshold criterion may include: whether the atmospheric measurement is the lowest or highest among other measurements of other nodes, is below or above a threshold value, or is similar to other measurements of other nodes; whether the location is within an acceptable distance from an estimated location of the receiver or another specified location (e.g. of another node); whether the age of the atmospheric sensor exceeds a specified age; whether the time since the atmospheric sensor was calibrated exceeds a specified amount of time; or other considerations.

Method steps described herein may be order independent, and can therefore be performed in an order different from that described. It is also noted that different method steps described herein can be combined to form any number of methods, as would be understood by one of skill in the art. It is further noted that any two or more steps described herein may be performed at the same time. Any method step or feature disclosed herein may be expressly restricted from a claim for various reasons like achieving reduced manufacturing costs, lower power consumption, and increased processing efficiency. Method steps performed by a transmitter or a receiver can be performed by a server, or vice versa.

Methods of this disclosure may be implemented by hardware, firmware or software. Non-transitory machine-readable media embodying program instructions adapted to be executed to implement any of the described methods are contemplated. Execution of the program instructions by one or more machines cause the machines to carry out the methods. Machine-readable media may include non-volatile or volatile storage media, removable or non-removable media, integrated circuit media, magnetic storage media, optical storage media, or any other storage media. As used herein, machine-readable media includes all forms of statutory machine-readable media, but not non-statutory machine-readable media. By way of example, machines may include one or more computing device(s), processor(s), controller(s), integrated circuit(s), chip(s), system(s) on a chip, server(s), programmable logic device(s), other circuitry, and/or other suitable means described herein or otherwise known in the art. Some systems are contemplated to include machine-readable media and one or more machines.

Systems comprising one or more modules that perform or are operable to perform different method steps/stages disclosed herein are also contemplated, where the modules are implemented using one or more machines listed herein or other suitable hardware. By way of example, systems may comprise: a receiver with one or more atmospheric sensors that generate receiver atmospheric data; a network of reference atmospheric sensors that generate atmospheric reference data; and one or more hardware modules that perform methods described herein. For example, a selection module includes one or more inputs to receive the atmospheric reference data sent from reference nodes, is configured to select a subset of the atmospheric reference data, and includes one or more outputs to send the selected subset of atmospheric reference data. A generation module includes one or more inputs to receive the selected subset of atmospheric reference data, is configured to generate an estimate of the receiver's altitude using atmospheric data collected by the receiver and the selected subset of atmospheric reference data, and includes one or more outputs to send the generated estimate of the receiver's altitude.

When two things (e.g. modules or other features) are "coupled to" each other, those two things may be directly connected together (e.g. shown by a line connecting the two things in the drawings), or separated by one or more intervening things. Where no lines and intervening things connect two particular things, coupling of those things is contemplated unless otherwise stated. Where an output of one thing and an input of another thing are coupled to each other, information (e.g. data and/or signaling) sent from the output is received by the input even if the data passes through one or more intermediate things. All information disclosed herein may be transmitted over any communication pathway using any protocol. Data, instructions, commands, information, signals, bits, symbols, and chips and the like may be represented by voltages, currents, electromagnetic waves, magnetic fields or particles, or optical fields or particles.

The words comprise, comprising, include, including and the like are to be construed in an inclusive sense (i.e. not limited to) as opposed to an exclusive sense (i.e. consisting only of). Words using the singular or plural number also include the plural or singular number, respectively. The word or and the word and, as used in the Detailed Description, cover any of the items and all of the items in a list. The words some, any and at least one refer to one or more. The term may is used herein to indicate an example, not a requirement—e.g. a thing that may perform an operation or may have a characteristic need not perform that operation or have that characteristic in each embodiment, but that thing performs that operation or has that characteristic in at least one embodiment.

RELATED APPLICATIONS

This application relates to the following related application(s): U.S. Pat. Appl. No. 62/214,741, filed Sep. 4, 2015, entitled SYSTEMS AND METHODS FOR SELECTING ATMOSPHERIC DATA OF REFERENCE NODES FOR USE IN COMPUTING THE ALTITUDE OF A RECEIVER. The content of each of the related application(s) is hereby incorporated by reference herein in its entirety.

The invention claimed is:

1. A method for using atmospheric data from one or more reference nodes to estimate an altitude of a receiver, the method comprising:
identifying assistance data associated with a set of reference nodes within a region;
selecting, using the assistance data, a subset of reference nodes from the set of reference node,
wherein selecting the subset of reference nodes comprises (i) identifying, from the assistance data, a temperature measured by each of the reference nodes in the set, and (ii) selecting, as the only member of the subset, the reference node that measured the lowest temperature, or
wherein selecting the subset of reference nodes comprises (i) identifying, from the assistance data, a temperature measured by each of the reference nodes in the set, and (ii) selecting, as the only member of the subset, the reference node that measured the closest temperature to a temperature measured by the receiver, or
wherein selecting the subset of reference nodes comprises selecting, as the only members of the subset, the reference nodes within the set that each measured a temperature below a threshold temperature value, and that are located within a range of vertical distances, or
wherein selecting the subset of reference nodes comprises selecting, as the only members of the subset, the reference nodes within the set that each measured a temperature that is within an identified numerical range, or
wherein selecting the subset of reference nodes comprises (i) measuring a temperature at the receiver, and (ii) selecting, as the only members of the subset, the reference nodes within the set that each measured a temperature that is within an identified amount of temperature from the temperature measured at the receiver;
identifying atmospheric reference data associated with the subset of reference nodes; and
generating an estimate of the altitude of the receiver using the atmospheric reference data associated with the subset of reference nodes,
wherein the estimate of the altitude is generated without using atmospheric reference data associated with the reference nodes in the set that are not in the subset.

2. The method of claim 1, wherein the atmospheric reference data associated with the subset of reference nodes includes data that specifies computed reference pressures of the reference nodes in the subset.

3. The method of claim 1, wherein selecting a subset of reference nodes comprises:
identifying, from the assistance data, a temperature measured by each of the reference nodes in the set; and
selecting, as the only member of the subset, the reference node that measured the lowest temperature.

4. The method of claim 1, wherein selecting a subset of reference nodes comprises:
identifying, from the assistance data, a temperature measured by each of the reference nodes in the set; and
selecting, as the only member of the subset, the reference node that measured the closest temperature to a temperature measured by the receiver.

5. The method of claim 1, wherein selecting a subset of reference nodes comprises:
selecting, as the only members of the subset, the reference nodes within the set that each measured a temperature below a threshold temperature value, and that are located within a range of vertical distances.

6. The method of claim 1, wherein selecting a subset of reference nodes comprises:
selecting, as the only members of the subset, the reference nodes within the set that each measured a temperature that is within an identified numerical range.

7. The method of claim 1, wherein selecting a subset of reference nodes comprises:
measuring a temperature at the receiver; and
selecting, as the only members of the subset, the reference nodes within the set that each measured a temperature that is within an identified amount of temperature from the temperature measured at the receiver.

8. The method of claim 1, wherein generating the estimate of the altitude comprises:
identifying reference pressures from the atmospheric reference data associated with the subset of reference nodes;
generating an average of the reference pressures; and
using the average to generate the estimate of the altitude.

9. The method of claim 8, wherein the average of the reference pressures is a weighted average of the reference pressures, and wherein generating the estimate of the altitude comprises:
generating, for each of the identified reference pressures, a weight that is inversely proportional to the line-of-sight distance between an initial estimate of the receiver's position and the reference node with which that reference pressure is associated; and
using each of the generated weights to generate the weighted average of the reference pressures.

10. A method for using atmospheric data from one or more reference nodes to estimate an altitude of a receiver, the method comprising:
- identifying assistance data associated with a set of reference nodes within a region;
- selecting, using the assistance data, a subset of reference nodes from the set of reference nodes;
- identifying atmospheric reference data associated with the subset of reference nodes; and
- generating an estimate of the altitude of the receiver using the atmospheric reference data associated with the subset of reference nodes,
- wherein the estimate of the altitude is generated without using atmospheric reference data associated with the reference nodes in the set that are not in the subset,
- wherein generating the estimate of the altitude comprises (i) identifying reference pressures from the atmospheric reference data associated with the subset of reference nodes; (ii) generating an average of the reference pressures, and (iii) using the average to generate the estimate of the altitude,
- wherein the average of the reference pressures is a weighted average of the reference pressures, wherein generating the estimate of the altitude comprises: (i) generating, for each of the identified reference pressures, a weight that is inversely proportional to a temperature difference between a temperature measured at the receiver and a temperature measured at the reference node with which that reference pressure is associated; and (ii) using each of the generated weights to generate the average of the reference pressures.

11. One or more non-transitory machine-readable media embodying program instructions that, when executed by one or more machines, cause the one or more machines to implement a method for using atmospheric data from one or more reference nodes to estimate an altitude of a receiver, the method comprising:
- identifying assistance data associated with a set of reference nodes within a region;
- selecting, using the assistance data, a subset of reference nodes from the set of reference nodes,
  - wherein selecting the subset of reference nodes comprises (i) identifying, from the assistance data, a temperature measured by each of the reference nodes in the set, and (ii) selecting, as the only member of the subset, the reference node that measured the lowest temperature, or
  - wherein selecting the subset of reference nodes comprises (i) identifying, from the assistance data, a temperature measured by each of the reference nodes in the set, and (ii) selecting, as the only member of the subset, the reference node that measured the closest temperature to a temperature measured by the receiver, or
  - wherein selecting the subset of reference nodes comprises selecting, as the only members of the subset, the reference nodes within the set that each measured a temperature below a threshold temperature value, and that are located within a range of vertical distances, or
  - wherein selecting the subset of reference nodes comprises selecting, as the only members of the subset, the reference nodes within the set that each measured a temperature that is within an identified numerical range, or
  - wherein selecting the subset of reference nodes comprises (i) measuring a temperature at the receiver, and (ii) selecting, as the only members of the subset, the reference nodes within the set that each measured a temperature that is within an identified amount of temperature from the temperature measured at the receiver;
- identifying atmospheric reference data associated with the subset of reference nodes; and
- generating an estimate of the altitude of the receiver using the atmospheric reference data associated with the subset of reference nodes,
- wherein the estimate of the altitude is generated without using atmospheric reference data associated with the reference nodes in the set that are not in the subset.

12. The one or more non-transitory machine-readable media of claim 11, wherein the atmospheric reference data associated with the subset of reference nodes includes data that specifies computed reference pressures of the reference nodes in the subset.

13. The one or more non-transitory machine-readable media of claim 11, wherein selecting a subset of reference nodes comprises:
- identifying, from the assistance data, a temperature measured by each of the reference nodes in the set; and
- selecting, as the only member of the subset, the reference node that measured the lowest temperature.

14. The one or more non-transitory machine-readable media of claim 11, wherein selecting a subset of reference nodes comprises:
- identifying, from the assistance data, a temperature measured by each of the reference nodes in the set; and
- selecting, as the only member of the subset, the reference node that measured the closest temperature to a temperature measured by the receiver.

15. The one or more non-transitory machine-readable media of claim 11, wherein selecting a subset of reference nodes comprises:
- selecting, as the only members of the subset, the reference nodes within the set that each measured a temperature below a threshold temperature value, and that are located within a range of vertical distances.

16. The one or more non-transitory machine-readable media of claim 11, wherein selecting a subset of reference nodes comprises:
- selecting, as the only members of the subset, the reference nodes within the set that each measured a temperature that is within an identified numerical range.

17. The one or more non-transitory machine-readable media of claim 11, wherein selecting a subset of reference nodes comprises:
- measuring a temperature at the receiver; and
- selecting, as the only members of the subset, the reference nodes within the set that each measured a temperature that is within an identified amount of temperature from the temperature measured at the receiver.

18. The one or more non-transitory machine-readable media of claim 11, wherein generating the estimate of the altitude comprises:
- identifying reference pressures from the atmospheric reference data associated with the subset of reference nodes;
- generating an average of the reference pressures; and
- using the average to generate the estimate of the altitude.

19. The one or more non-transitory machine-readable media of claim 18, wherein the average of the reference pressures is a weighted average of the reference pressures, and wherein generating the estimate of the altitude comprises:

generating, for each of the identified reference pressures, a weight that is inversely proportional to the line-of-sight distance between an initial estimate of the receiver's position and the reference node with which that reference pressure is associated; and using each of the generated weights to generate the weighted average of the reference pressures.

20. One or more non-transitory machine-readable media embodying program instructions that, when executed by one or more machines, cause the one or more machines to implement a method for using atmospheric data from one or more reference nodes to estimate an altitude of a receiver, the method comprising:

identifying assistance data associated with a set of reference nodes within a region;

selecting, using the assistance data, a subset of reference nodes from the set of reference nodes;

identifying atmospheric reference data associated with the subset of reference nodes; and generating an estimate of the altitude of the receiver using the atmospheric reference data associated with the subset of reference nodes, wherein the estimate of the altitude is generated without using atmospheric reference data associated with the reference nodes in the set that are not in the subset, wherein generating the estimate of the altitude comprises (i) identifying reference pressures from the atmospheric reference data associated with the subset of reference nodes; (ii) generating an average of the reference pressures, and (iii) using the average to generate the estimate of the altitude, wherein the average of the reference pressures is a weighted average of the reference pressures, wherein generating the estimate of the altitude comprises: (i) generating, for each of the identified reference pressures, a weight that is inversely proportional to a temperature difference between a temperature measured at the receiver and a temperature measured at the reference node with which that reference pressure is associated; and (ii) using each of the generated weights to generate the average of the reference pressures.

* * * * *